Feb. 2, 1943.  W. E. BEEDE  2,309,927
METER
Filed June 21, 1939
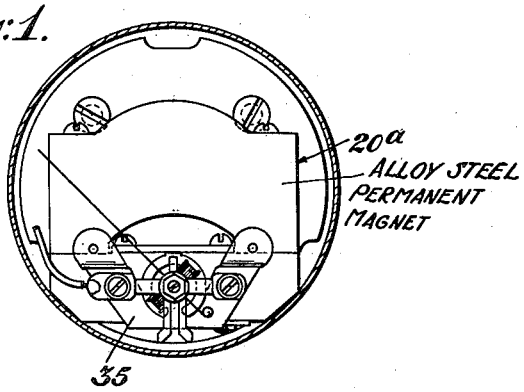
Fig: 1.
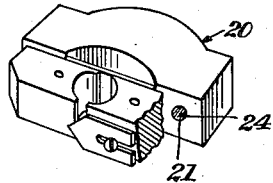
Fig: 2.
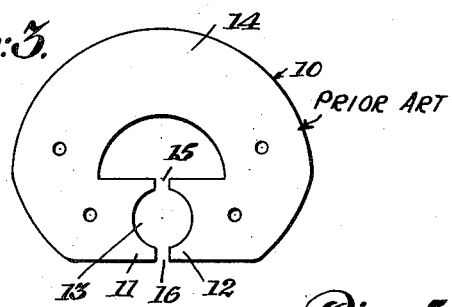
Fig: 3.
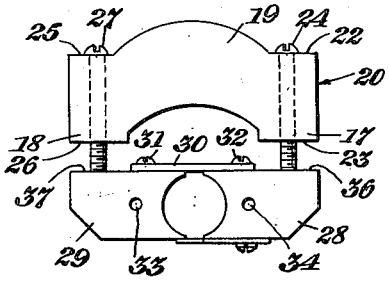
Fig: 4.
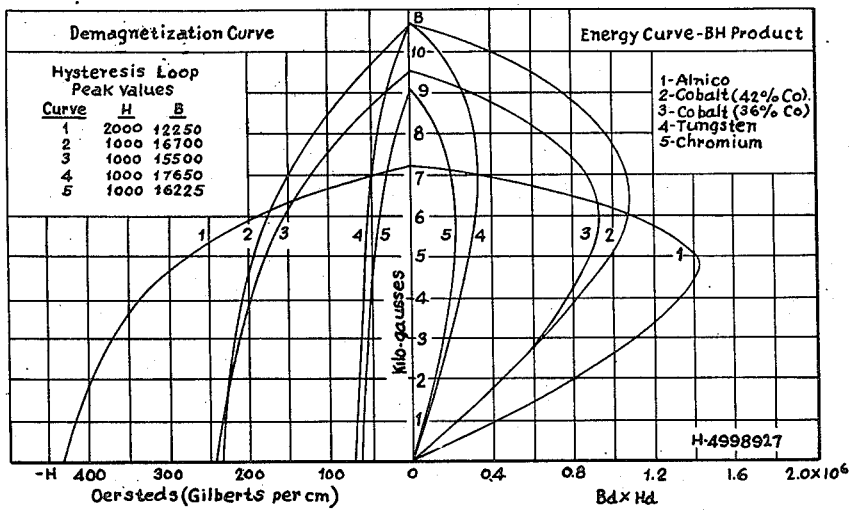
Fig: 5.
INVENTOR
WALTER E. BEEDE
BY
Van Deventer & Gries
ATTORNEYS.

Patented Feb. 2, 1943

2,309,927

UNITED STATES PATENT OFFICE 2,309,927

METER

Walter E. Beede, Penacook, N. H.

Application June 21, 1939, Serial No. 280,237

3 Claims. (Cl. 171—95)

This invention relates to improvements in meters, and has for an object the provision of a meter in which the pole shoes and a moving member are assembled as a unit, said unit having aligned surfaces on the pole shoes, and a magnet having aligned poles adapted to be screwed to said assembly and to automatically effect and maintain alignment of the shoes.

Another object of the invention is the provision in a meter of a magnet constructed of highly coercitive alloys incapable of being machined except by grinding, said magnet being so formed that when the magnet is finished two aligned ground surfaces are presented to the pole shoe structure of the meter.

Another object of the invention is the provision of a magnet for meters constructed of highly coercitive alloys in which poles of the magnet are spaced apart from each other, the opposite termini of the poles being defined by the length of the magnet, said magnet having a section of material between the poles of greater cross section than the area of the poles thereby providing after the magnet has been magnetized, a powerful magnetic flux to said poles.

Still another object of the invention is the provision of a cast magnet for meters formed of highly coercitive alloys, said magnet being of varying cross sections throughout its length, and said poles being spaced apart a sufficient distance to permit the necessary high magneto-motive force to be applied thereto for magnetizing said magnet, the form of the magnet also being such that the magneto-motive force may be applied to the magnet in a plurality of planes for more effectively lining up the molecular structure.

A further object of the invention is the provision in a meter of a cast magnet having pole sections of cubic proportions joined by a bridge of material less in height than the width of the magnet and of a cross section equal to or greater than the cross section of said pole sections.

Still another object of the invention is the provision in a meter of a cast magnet having pole sections of cubic proportions joined by a curved bridge of material formed integral with said pole sections and having a span of less than 135°.

Other objects and advantages of the invention will be apparent to those skilled in the art.

Referring to the drawing:

Figure 1 is a plane view of a meter with the dial removed showing the relation of the parts in a meter and comprising an embodiment of the invention;

Figure 2 is a perspective view of my new and improved magnet showing the relation of the pole shoes;

Figure 3 is a view of one type of magnet of the prior art commonly employed in meters;

Figure 4 is a view showing my new and improved magnet being applied to a pole shoe structure; and Figure 5 is a curve showing the hysteresis loop peak values of various steel alloys.

In the use of highly coercitive magnet alloys, of which "Alnico" might be a typical example, the materials are so hard that machining is either difficult or practically impossible. In view of this, the simplest method of making a magnet of such material or materials is to cast the magnet and while casting it to form therein all necessary holes for mounting, etc., thereby eliminating the arduous task of drilling holes. I have found that by casting magnets of such materials it was possible to so form the magnet that the poles were straight in line with each other and thereby limit the finishing process to a straight grinding operation in which the grinding wheel merely traverses the pole faces where they are to member up with the pole shoe and moving coil structure of the meter.

I have also found that with highly coercitive steel alloys, a greater magneto-motive force is necessary in order to efficiently or fully magnetize such magnets. I have made magnets following the trend of the prior art, such as the one illustrated in Figure 3 and designated by the numeral 10, having pole shoes 11 and 12 formed integral with the magnet and provided with a bore 13 for the moving coil structure. The machining of such a magnet was a slow and laborious task, and after completing such a magnet I have found that it was practically impossible to properly magnetize it. This was due to the fact that when a powerful magneto-motive force was applied to the magnet, that most of the flux, instead of passing around through the body 14 of the magnet, shunted across the air gaps 15 and 16, thus demonstrating that it is practically impossible to properly magnetize a magnet made in accordance with the teachings of the prior art.

In my new and improved magnet 20, the pole sections 17 and 18 are spaced apart from each other a substantial distance and are of cubic proportions. A bridge 19 of the same material joins the pole sections 17 and 18. This bridge is preferably curved in form and spans an angle of less than 135°, in fact in the magnet illustrated in Figures 2 and 4, the arc or curve of the bridge portion is approximately 90°. The magnet 20 is preferably cast, and a hole 21, shown in Figure 2, extends from the flat upper surface 22 to the lower face 23 of the pole section 17 to permit a screw 24 to pass therethrough. The pole section 18 has a similar hole extending from the flat upper surface 25 to the lower face 26 to permit a screw 27 to pass therethrough.

Although the cross section of the bridge portion 19 of the magnet as shown in Figures 2 and 4 has approximately the same cross section as that of the pole sections, in some instances I prefer to have the cross section of the bridge member greater than the cross section of the pole sections, in which instance a greater magnetic flux from the poles is available.

When a magnet such as the magnet 20 shown in Figure 4 is cast, the only machining operation necessary is to grind the lower faces 23 and 26 flat and in alignment with each other, the holes such as that illustrated at 21 having been cast in when the magnet was being formed.

With a magnet such as the magnet 20 made according to my invention, the moving coil structure, which includes pole shoes 28 and 29 secured together by a strap member 30 utilizing screws 31, 32 and having holes 33 and 34 formed therein for mounting the moving coil, its supports, etc., and designated generally by the numeral 35, in Figure 1, may be completely assembled before the magnet is applied.

The upper surfaces 36 and 37 of the shoes 28 and 29 respectively are held approximately in line with each other by the strap member 30 and since the lower faces 23 and 26 of the magnet are accurately ground in alignment with each other, the pole shoes are very accurately brought into line with each other and maintained in such alignment when the magnet 20 is secured to the shoes 28 and 29 by means of the screws 24 and 27.

From the above description, it may be seen that by the herein described invention, I obtain the following advantages:

1. Simplicity of assembling the magnet to the pole pieces.
2. Cheap magnet construction.
3. Flat surfaces of the magnet tightened to the upper flat side of the pole pieces automatically aligns the parts and maintains them in alignment. The non-magnetic strap makes non-alignment impossible.
4. The greatest efficiency for the weight of magnet is obtained.

In case of ordinary design, as has been customary in the prior art, the distance between the magnet jaws must be exact as the pole pieces fit perfectly between said jaws, whereas in my arrangement described, the magnet is attached to one side of the pole pieces only instead of at both ends. Most of the actual machine work is done on the pole pieces and this structure is made of materials easily machined and the actual finishing of the magnet consists only in the straight grinding operation.

Figure 5 is a double diagram comparing the magnetization energy curves of 1—Alnico; 2—cobalt (42%); 3—cobalt (36%); 4—tungsten; and 5—chromium alloys with each other and with the demagnetization curves of the same alloys.

Although a simple embodiment of the invention is herein shown and described by way of example, it is obvious that many changes may be made in the form of the magnet and the arrangement of the parts without departing from the spirit of the invention as defined in the following claims.

What is claimed is:

1. In an electric meter, in combination, a pair of pole shoes having air gaps therebetween and a D'Arsonval valve type of moving coil between said shoes and carrying a pointer, a strip of non-magnetic material spanning the gap between said pole shoes and secured to both said shoes for preliminarily holding said shoes in definite relationship to each other, said pole shoes each having a tapped hole formed therein and said holes being spaced apart from each other, and a magnet having a pair of pole sections spaced apart from each other and joined laterally by a curved bridge formed integral therewith, the pole faces of said pole sections being aligned with each other in one plane and having cast holes extending therethrough at substantially right angles to said plane, the spacing between said cast holes being substantially the same as the spacing between said tapped holes, whereby screws passing through said cast holes may engage said tapped holes and tightened to rigidly secure and maintain said shoes in said definite relationship.

2. A meter according to claim 1, wherein said strip is formed of a length to fit between said pole sections and thereby forms a guide for accurately locating said magnet on said pole shoes with said cast holes in alignment with said tapped holes.

3. In an electric meter, in combination with a movement, a cast magnet formed of a highly coercitive steel alloy having poles with rectangular bases, said poles being spaced apart a sufficient distance to permit the necessary high magneto-motive force to be applied thereto for magnetizing said magnet, cast holes formed in each of said poles and extending through said bases, a curved bridge formed integral with and joining said poles laterally, the upper extremities of said bridge terminating in said poles a sufficient distance away from the vertical sides of the magnet to present a flat surface about the upper extremities of said cast holes to be engaged by the heads of screws for securing said magnet to said movement, said bridge being of a height less than the width of the magnet.

WALTER E. BEEDE.